April 26, 1966   R. H. BENSON ETAL   3,248,088
TENSIONING DEVICE
Filed Oct. 24, 1963   4 Sheets-Sheet 1

INVENTORS.
ROBERT H. BENSON
SAMUEL V. MINSKEY, JR.
BY
Kimmel & Crowell
ATTORNEYS.

INVENTORS.
ROBERT H. BENSON
SAMUEL V. MINSKEY, JR.
BY Kimmel & Crowell
ATTORNEYS.

INVENTORS.
ROBERT H. BENSON
SAMUEL V. MINSKEY, JR.
BY
Kimmel & Crowell
ATTORNEYS.

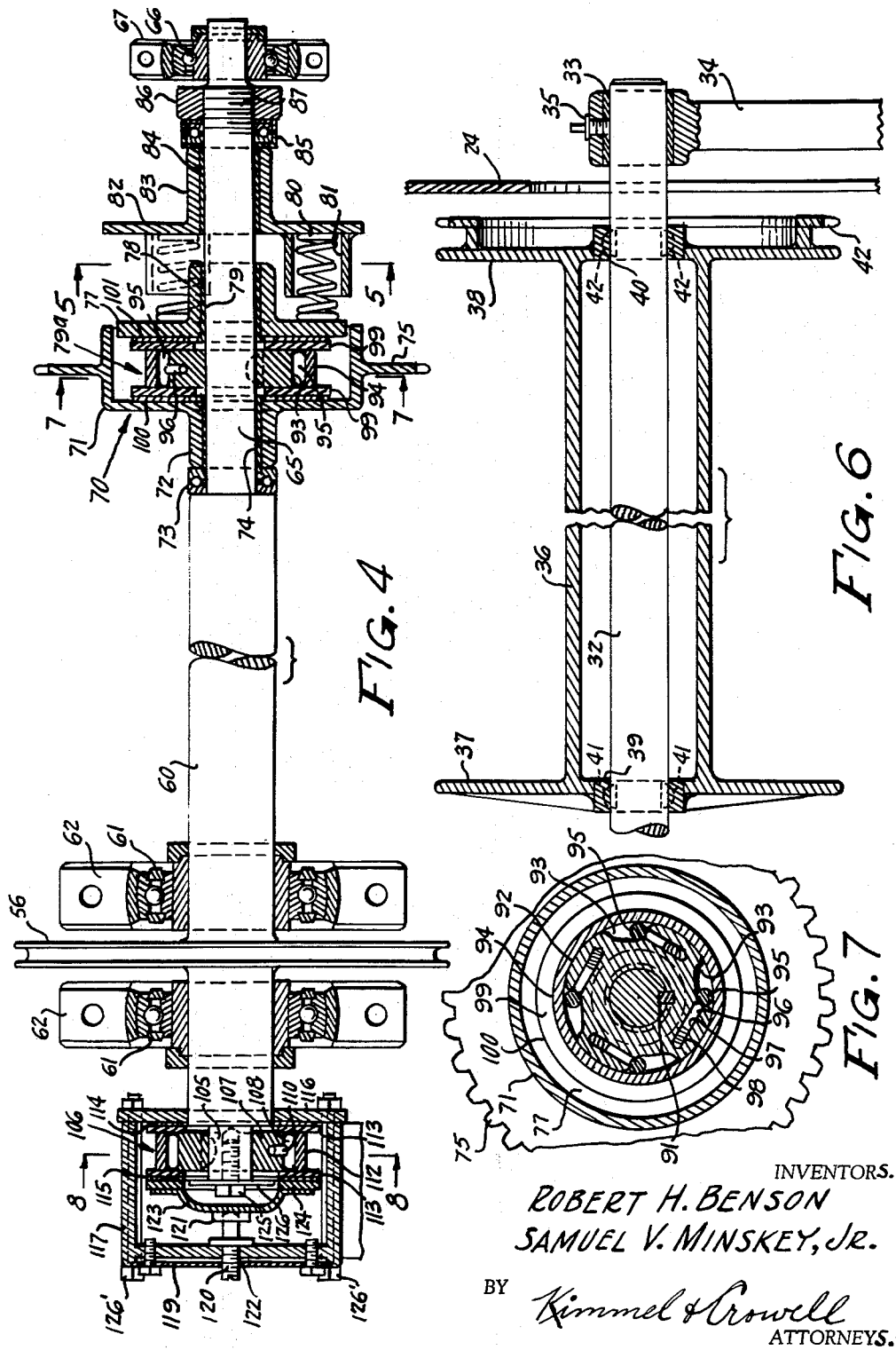

United States Patent Office 3,248,088
Patented Apr. 26, 1966

3,248,088
TENSIONING DEVICE
Robert H. Benson, Concord, and Samuel V. Minskey, Jr., Knoxville, Tenn., assignors to Mannis Winch and Steel Company, Knoxville, Tenn.
Filed Oct. 24, 1963, Ser. No. 318,614
8 Claims. (Cl. 254—172)

This invention relates to a tensioning device and has particular applicability to apparatus for retaining a cable under tension while being wound on or unwound from a drum, winch, or similar apparatus.

As conducive to a clearer understanding of this invention, it may here be pointed out that in the use of winches, drums, windlasses, and similar apparatus, tangling of the cable frequently occurs due to the cable becoming slack as it is paid off from the drum and piling up or "squirrel caging," on the drum or spindle, and when the cable is being wound upon the drum, piling up rather than flat winding, causing a condition much like "squirrel caging," and allowing the load being handled to fall away from the drum because of the slack, thus putting an unusual, sudden and dangerous strain upon the cable and its associated drum.

A primary object of this invention is the provision of a device for substantially precluding the occurrence of the above-mentioned conditions while both winding and unwinding the cable.

As the causes of these two conditions, that is, the failure of the cable to wind flat when being wound in, and the cable "squirrel caging" when being paid out, are different, it has hitherto been necessary to apply different apparatuses to overcome the two different conditions.

Applicants have devised a single mechanism so constructed as to provide in a single structure the functions of two mechanisms, utilizing, in some instances the same parts, whereby the single mechanism overcomes both of the above-mentioned disadvantageous conditions, thus effecting many economies in parts, time, and installation costs which would be involved in the use of separate mechanisms.

In accomplishing the above objects, the conditions are remedied by providing mechanisms which will keep the cable under tension at all times between the tension sheave and the drum, and when the cable is being wound by the provision of apparatus including a swinging arm with a sheave at its end to feed the cable onto the drum evenly and in flat wound condition.

A further object of the invention is the provision of a relatively simple and inexpensive apparatus of this character which may be readily employed with any conventional type of winch, windlass, winding drum or the like, which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and disclosed in the accompanying drawings wherein there is shown a preferred embodiment of this inventive concept:

In the drawings:

FIGURE 4 is a sectional view, partially in elevation, taken substantially along the center line of the braking and clutch mechanism.

FIGURE 5 is a sectional view taken substantially along the line 5—5 of FIGURE 4 as viewed in the direction indicated by the arrows.

FIGURE 6 is a sectional view, partially broken away, and partially in elevation, showing the drum element and the sprocket therefor.

FIGURE 7 is a sectional view taken substantially along the line 7—7 of FIGURE 4 as viewed in the direction indicated by the arrows.

Similar reference characters refer to similar parts throughout the several views of the drawings.

Figure 2:
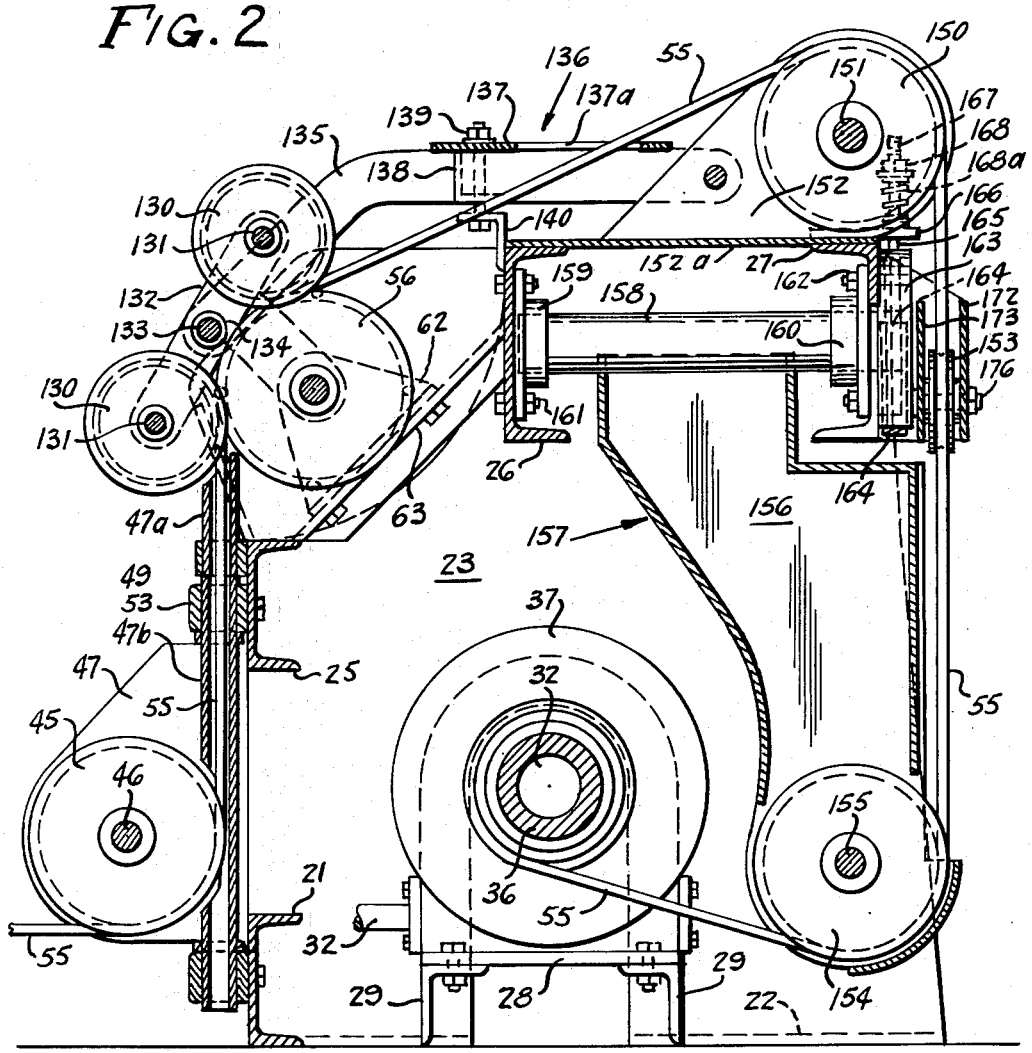
FIGURE 2 is a vertical cross-sectional view taken substantially along the line 2—2 of FIGURE 1 as viewed in the direction indicated by the arrows.
Figures 8, 9, 10:
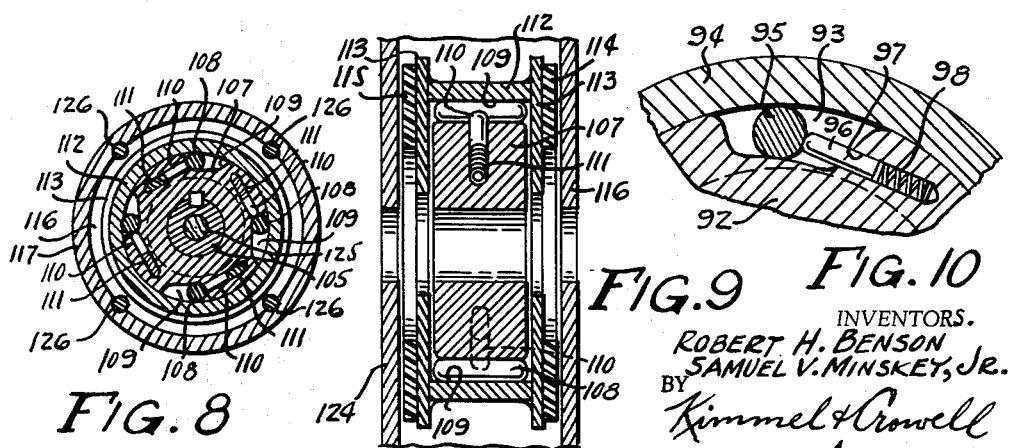
FIGURE 8 is a sectional view taken substantially along the line 8—8 of FIGURE 4 as viewed in the direction indicated by the arrows.
FIGURE 9 is an enlarged transverse sectional view taken through either the braking or clutching mechanism, the two being substantially identical, but opposite, showing the internal construction thereof.
FIGURE 10 is an enlarged fragmentary detail view through the mechanism as shown in FIGURE 9 disclosing constructional details.

Having reference now to the drawings, the device of the instant invention is generally indicated at 20, and comprises a frame which is formed with a bottom front inwardly facing relatively heavy channel bar 21, which is mounted on a base plate 22 between opposite vertical side plates 23 and 24. An intermediate heavy duty channel beam 25 extends transversely between the plates 23 and 24 at an intermediate point, and an upper front transverse channel plate 26 extends between the side plates adjacent the top. A rear top channel bar 27 is also provided adjacent the top of the device, has its inwardly turned flanges confronting those of channel member 26, as best shown in FIGURE 2.

The suitable supporting plate 28 carried by legs 29 is positioned interiorly of the side plate 23 adjacent one end thereof and has bolted thereto as by means of bolt plates 30 a transmission mechanism 31, which may be powered as by means of a suitable drive shaft 32a from any desired power source exterior of the apparatus. Journalled in the transmission housing 31 is one end of a drum shaft 32, the other end of which is mounted in the brushing 33 carried by a standard 34 mounted exteriorly of the side plate 24. As shown in FIGURE 6, suitable lubricating fitting 35 may be provided for the bearing 33 and suitable lubricating fittings (not shown) also provided for the transmission.

The shaft 32 carries a winch drum 36 preferably of tubular construction, as best shown in FIGURE 6 and provided at its opposite ends with flanges 37 and 38 including hubs 39 and 40, respectively, which are keyed as by means of keys 41 and 42 to the shaft 32. The flange 38 has fixed thereto a drive sprocket 42, for a purpose to be more fully described hereinafter.

Mounted on the front of the apparatus is a fair lead sheave 45 which is mounted on an axle 46 carried between a pair of plates 47 and 48. The plates 47 and 48 are connected to a tubular shaft 47b milled to receive and guide cable to sheave 45. This tube is firmly fixed to and made a part of plates 47 and 48 rotatably mounted in bearings 51 and 52 carried by mounting brackets 53 and 54 secured to the forward faces of channel members 25 and 21, respectively. A cable 55 to be wound or unwound passes interiorly of the sheave 45, and upwardly through the upper bearing 49, and a tube 47a which is attached to frame member channel 25 between bearing 51 and sheave 56, its function being to guide the cable 55 from sleave 56 into hollow tube 47b and sheave 45.

Figure 1:
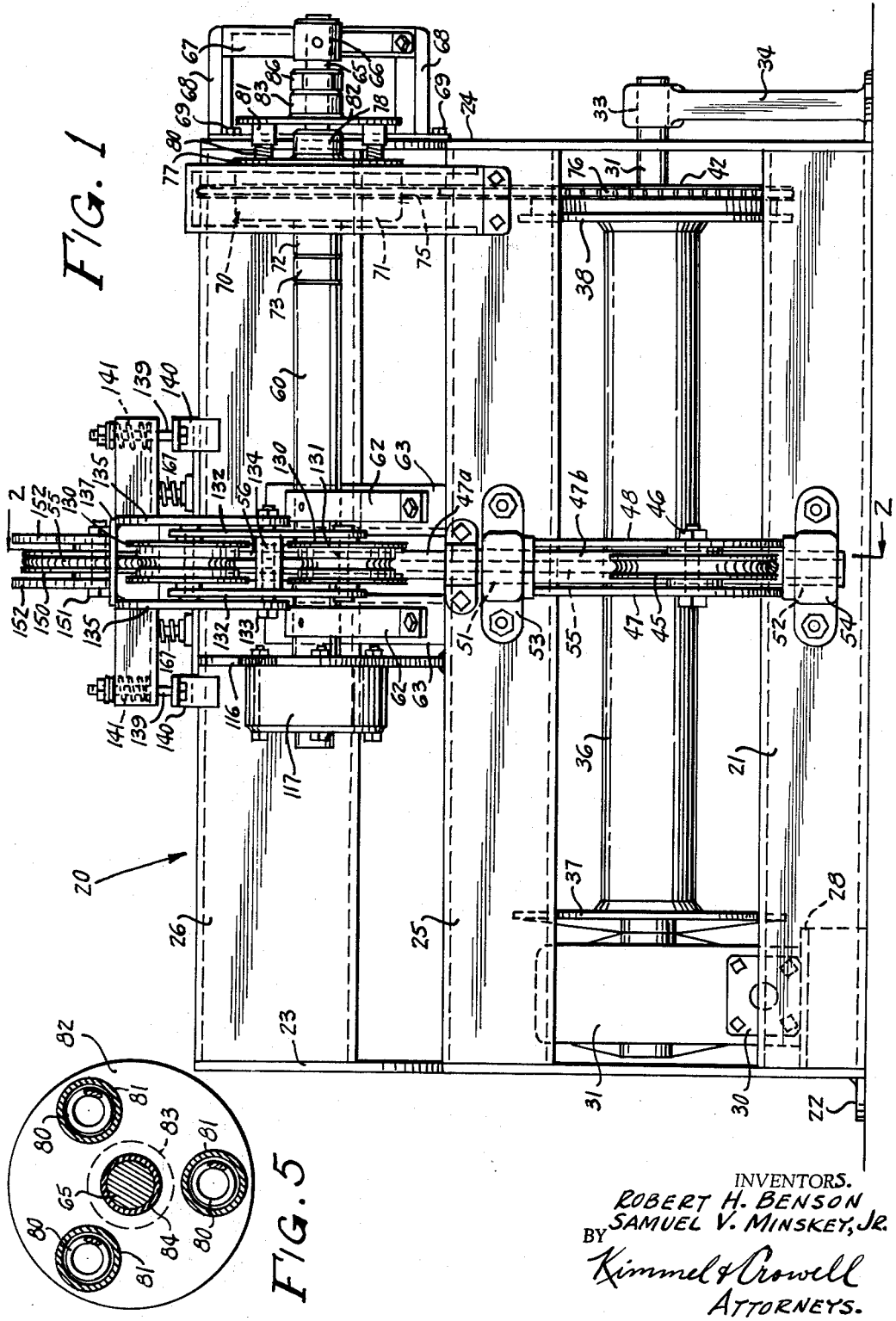
FIGURE 1 is a front elevational view of one form of device embodying the instant inventive concept.

The sheave 56 is firmly attached to a shaft 60 which is mounted in a pair of bearing assemblies 61 carried by bearing bracket 62 on opposite sides of sheave 56, the bearing bracket 62 being supported on an angularly disposed flight 63 which extends inwardly from the uppermost portion of channel member 25 to an intermediate point on channel member 26. Shaft 60 extends substantially across the front of the device, as best shown in FIGURES 1 and 4, and terminates in a reduced portion 65, the outer end of which is journalled in a bearing assembly 66 which in turn is carried by a bearing supporting bracket 67 which is carried in turn by a supporting frame member 68 bolted as by bolts 69 to the outer side of side plate 24.

The reduced end 65 of shaft 60 carries an override clutch assembly generally indicated at 70 which includes a clutch housing 71 including a sleeve 72, the end of which bears against a thrust bearing 73 and which contains the liner 74 surrounding reduced end 65. The clutch housing 71 carries about its external periphery a sprocket 75 which is engaged by a chain 76 which extends around sprocket 42 carried by drum flange 38. The opposite side of the housing comprises a plate 77 including a sleeve 78 having a liner 79 through which the reduced end of the shaft 60 extends, the plate being biased inwardly toward an override clutch assembly 79a carried within the housing 71 by means of springs 80 which bear against the plate 77. The opposite ends of the springs 80 are contained in sleeves 81 which in turn are mounted on a pressure plate 82 which is provided with a sleeve 83 containing an internal bronze bushing 84 through which the reduced end 65 passes. The sleeve is in turn engaged by a thrust bearing 85 and the pressure of the springs is controlled by a nut 86 mounted on a threaded extremity 87 of reduced end 65.

The override clutch member 79a includes a central disc-like member 92 keyed as by means of a key 91 to shaft portion 65 and provided with a series of peripheral recesses which taper at one end towards a surrounding annular sleeve 94. Each recess 93 contains a roller bearing 95 which is biased toward the shallow end of the recess by means of a pin 96 contained in a bore 97 extending transversely to the deep end of the recess and biased forwardly by means of a spring 98. The sleeve 94 is provided with side plates 99, which bear against transverse liners 100 and 101, which in turn are fixed to the side of casing 71 and plate 77 respectively. The arrangement of the pins and the taper of the recesses is such that the override clutch assembly herein described acts as a brake when the cable is being wheeled out, and when the cable is being wheeled in, is inactivated due to the reverse direction of rotation of the sleeve 84 occasioned by the rotation of shaft 60.

The opposite end of shaft 60 is provided with a reduced end portion 105, which is surrounded by an override clutch assembly generally indicated at 106, which includes a disc 107 identical with the disc 92 and containing pins 108 which engage bearings 109 containing recesses identical to the recesses 93 but oppositely disposed relative thereto so that the brake or override clutch assembly 106 acts when the shaft is rotated in the opposite direction, or when the cable is being reeled in. Pins 110 biased by springs 111 engage bearings 109 and urge them against the periphery of a sleeve 112 which in turn is positioned between side plates 113, which carry liners 114 and 115, respectively. The liner 114 is adapted to engage the inner face of a side plate 116 which comprises part of a brake housing 117, the opposite end of which is closed by a plate 119.

The plate 119 is apertured to receive an adjusting screw 120, the inner end of which seats in a boss 121 carried by a pressure yoke 123, the inner face of which carries a plate 124 which bears against liner 115. Obviously, adjustment of pressure screw 120 will vary the pressure exerted by the plate 124 against the clutch assembly, thus permitting adjustment of the tension to which the device reacts.

A bolt 125 extending through a washer 126 into a threaded bore in the reduced end 105 of shaft 60 serves to hold the brake assembly in position, while bolts 126' serve to hold the plates 116 and 119 in related assembly with the casing or housing 117.

A pair of pressure sheaves 130 are mounted adjacent sheave 56 on axles 131, which are in turn mounted at opposite ends with a pair of flat bars 132. The bars 132 are in turn pivotally mounted on a bolt 133 which is mounted within a sleeve 134 carried between the opposite side plates 135 of a pressure arm assembly generally indicated at 136 which includes a top plate 137 having an opening 137a therein through which cable 55 passes from sheave 56. The top plate 137 is connected to a cross angle iron 138 which is mounted on bolts 139 at its opposite ends carried by brackets 140 which in turn are carried by channel member 26. The horizontal flange of the angle iron 138 is biased downwardly by means of compression springs 141, which serve to impart pressure to the sheaves 130 and hold the cable 55 tightly against sheave 56 in order that cable 55 will not slip in the sheave 56.

After passing upwardly through opening 137a cable 55 passes over a top sheave 150 which is carried by an axle 151 mounted between a pair of plates 152 mounted on the top of a plate 152a which extends transversely across the upper flanges of channel members 26 and 27.

The cable 55 passes from the sheave 150 downwardly between a pair of laterally disposed hold back sheaves 153a to a lower guide pulley 154 which is mounted on an axle 155 carried between the lower extremities of the sag plates 156 of a pendulum fixed assembly generally indicated at 157 and to be more fully described hereinafter. The pendulum assembly 157 includes a heavy duty axle 158, the ends of which are journalled in bearings 159 and 160 which are bolted as by means of bolts 161 and 162, respectively, to the inner sides of channel members 26 and 27. The axle 158 extends through an opening in channel member 27 and carries on its outer extremity a brake drum 163, which is engaged by a semicircular brake band 164, the extremities of which extend upwardly and are connected to studs 165 which extend through openings in plates 166 which are secured as by welding or the like to the top flange of channel member 27. The threaded upper extremities 167 of studs 165 are provided with springs 168a and adjusting nuts 168 by means of which the tension of the brake band 164 may be varied.

The hold back sleeves 153a are mounted on axles 170 and 171, respectively, which are mounted between a pair of plates 172 and 173 comprising portions of a plate assembly generally indicated at 174 which includes laterally extending opposite flanges 175 which are slotted as at 176 to accommodate bolts 177 threaded in suitable apertures in the face of channel member 27, the arrangement being such that the control sheaves may be vertically adjusted to effectively bring in balance the side forces exerted against the swing of the pendulum. From pulley 154 the cable is wound on or unwound from drum 36, as best shown in FIGURE 2.

From the foregoing the use and operation should now be readily understandable. Assuming that a cable is wound on drum 36 and that it is desired to pay out or withdraw the same, the override clutch assembly 70 serves to keep the cable taut. It is pointed out that the clutch housing 71 is supported entirely on the shaft extension 65, while the inner core or disc 92 is keyed to the shaft 65. As the cable is let out the revolution of drum 36 through sprocket 42 and chain 76, rotates sprocket 75 and its associated clutch housing 71, which in turn tends to rotate the sheave 56 faster than the cable can leave the drum and with enough force exerted by the clutch friction upon the shaft to cause its rotation and the rotation of sheave 56 with enough force to keep the cable taut between the sheave 56 and the drum 36. The clutch operates on the well-known principle and mechanism employed in "free wheeling" as applied to automobile drives and bicycle brakes.

When the cable is being reeled in, however, the clutch assembly 106 being supported on a fixed base, the friction between the cable and the sheave 56 rotate shaft 60 and sets up a frictional drag by rotating a member 107 which is keyed to the shaft 60, which in turn through the frictional resistance between the rotor and the clutch cylinder revolves the clutch cylinder. The movement of the cylinder and clutch sleeve 106 is braked by the pressure of friction discs 114 and 115, the resistance of which is governed by pressure plate 124 which is in turn controlled by a screw 122. It will be understood that in each instance the opposite clutch is free wheeling or inactive during the reverse movement of the cable drum 36.

The effect of the pendulum arm assembly 157 and the sheaves 153a is to feed the cable 55 upon the drum 56 from the sheave 154 thus allowing the cable to be presented to the drum spindle from a position at right angles to the axis of the spindle at the point where the cable is coming in contact with the spindle or the cable coiled upon it. Thus, because of the tension maintained in the position from which the pendulum feeds the cable to the drum, there is little tendency of the cable to deviate from a flat pattern and if the mechanism is properly adjusted and the cables are clean and in good condition, a satisfactory flat wind will be achieved.

Figure 3:
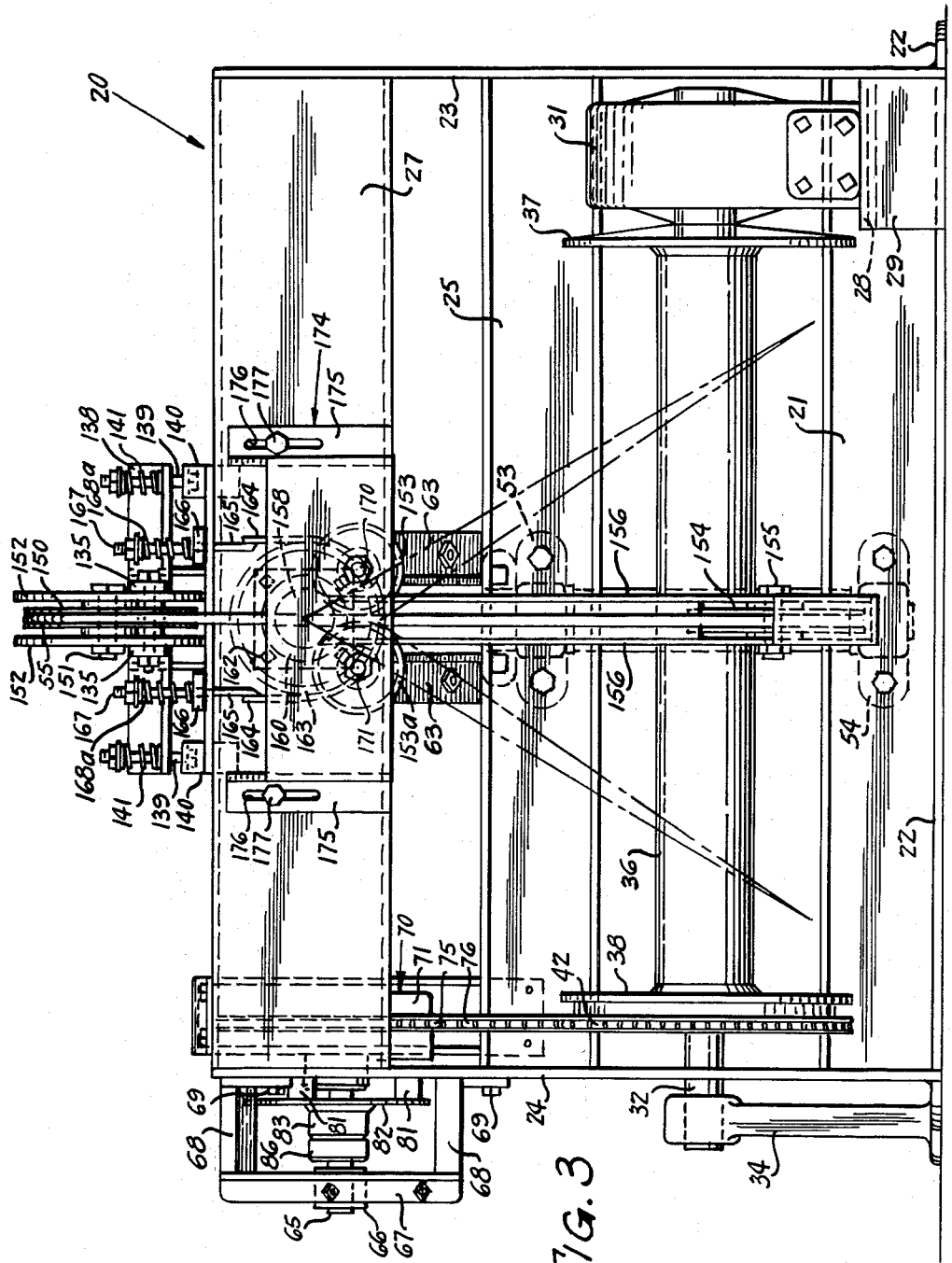
FIGURE 3 is a rear elevational view of the device, various positions of adjustment being indicated by dotted lines.

Since the cable is reeled on or off of the drum 36 while held under tension and in a taut condition at all times, the diameter of the surface on which the cable is being wound is always smaller than the diameter of the surface on which the cable has been wound. Hence, the cable being wound under tension will naturally follow the smaller diameter and not the larger diameter of the winding drum 36. As the winding drum revolves the cable 55 winding against itself moves the pendulum assembly 157 pivotally as indicated by the dotted lines in FIGURE 3. The brake 163, 164 functions to steady the movement of the pendulum, this action tending to give an even and smooth wind to the cable. The control sheaves 153 and 153a are set, by means of the slots 176 in a position relative to the length and diameter of the winding drum and the length of the pendulum arm, as will be described hereinafter. The path of travel of the pendulum must also be limited in relation to the size and capacity of the winding mechanism.

The determination of the length of the pendulum and the proper positioning of the control sheaves may be effected in the following manner: After the winding drum 36 has been properly set in horizontal position, determine the largest diameter of the drum barrel when the desired amount of cable is spooled on the drum. A line is then drawn on each side or end of the drum on the inside of the flanges and on the lower side of the drum at the largest diameter. A line drawn from the lower end of the aforementioned line at 30 degrees will intersect the center line of the drum at the point of location of the pendulum hinged pin center or the center of pin 158. The length of the pendulum is determined as being from the center of the hinged pin to the point where the cable leaves the sheave toward the drum, that is, the sheave 154.

In determining the distance to locate the control sheaves 153a below the pivotal point 158 of the pendulum hinge, it is desirable to position the control sheaves by trial. For there is a point where if the sheaves are located below 158 the forces of the cable on the pendulum will be laterally balanced in operation and the cable being fed to the drum will feed practically at right angles to the drum spindle which is necessary to achieve a flat and close-winding on the winch spindle. As the winding process proceeds, the cable, being in tension, does not override the wound cable, but is forced along by the pressure of the wound cable causing the cable, fed from the pendulum guide sheave, to move the pendulum in winding direction until the cable reaches the spindle flange, where the cable rides the wound cable and reverses its lateral movement.

From the foregoing it will now be seen that there is herein provided an improved apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:
1. In a device of the character described, in combination, a frame including a front and rear, a drum mounted transversely in said frame, means for rotating said drum, a fair lead sheave pivotally mounted for horizontal movement on the front of said frame, a tension shaft extending transversely across said frame above said drum, a main tension sheave on said shaft, a guide sheave on the top of said frame adjacent the rear thereof, a pendulum assembly mounted beneath said guide sheave, said assembly including a depending movable sheave at the free end thereof adjacent said drum, a cable extending from said fair lead sheave over said tension sheave, guide sheave and movable sheave to said drum, a pair of oppositely disposed overriding clutch members on said tension shaft, a clutch housing for each of said clutch members, one of said clutch housings being fixedly mounted relative to said shaft and the other being rotatably carried by said shaft, a sprocket on said other clutch members, a second sprocket of greater diameter on said drum, and a chain connection between said sprockets.

2. The structure of claim 1 wherein said pendulum assembly comprises a pivot axle mounted in said frame above and transverse to said drum, a pair of side plates depending from said pin, said sheave being mounted between the extremities of said plates.

3. The structure of claim 2 wherein said axle is provided with a brake drum and an adjustable brake band carried by said frame extends about said drum.

4. The structure of claim 3 wherein control sheaves are positioned below said guide sheave on opposite sides of said cable.

5. The structure of claim 4 wherein means are provided by varying the position of said control sheaves relative to the center line of said pendulum axle.

6. The structure of claim 1 wherein auxiliary pressure sheaves are located in alignment with said main tension sheave, and spring means are provided for biasing said auxiliary pressure sheaves toward said main tension sheave.

7. The structure of claim 6 wherein means are provided for adjusting the tension of said spring means.

8. The structure of claim 1 wherein means are provided for varying the pressure extended by said overriding clutch members.

References Cited by the Examiner
UNITED STATES PATENTS
2,042,481  6/1936  Patterson _____ 254—172
2,303,847  12/1942  Lamond _____ 254—172

SAMUEL F. COLEMAN, *Primary Examiner.*
H. C. HORNSBY, *Assistant Examiner.*